US010634052B2

United States Patent
Uhlmann et al.

(10) Patent No.: US 10,634,052 B2
(45) Date of Patent: Apr. 28, 2020

(54) TURBINE WITH PRESSURE DISTRIBUTER

(71) Applicant: Robert Bosch GmbH, Stuttgart (DE)

(72) Inventors: Dietmar Uhlmann, Korb (DE); Giuseppe Di Giandomenico, Heilbronn (DE); Luiz-Alexandre Colodel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 16/310,612

(22) PCT Filed: May 18, 2017

(86) PCT No.: PCT/EP2017/061950
§ 371 (c)(1),
(2) Date: Dec. 17, 2018

(87) PCT Pub. No.: WO2017/215878
PCT Pub. Date: Dec. 21, 2017

(65) Prior Publication Data
US 2019/0211747 A1   Jul. 11, 2019

(30) Foreign Application Priority Data
Jun. 16, 2016 (DE) .................. 10 2016 210 782

(51) Int. Cl.
*F02C 6/12* (2006.01)
*F01D 3/04* (2006.01)

(52) U.S. Cl.
CPC .................. *F02C 6/12* (2013.01); *F01D 3/04* (2013.01); *F05D 2220/40* (2013.01)

(58) Field of Classification Search
CPC ........... F02C 6/12; F01D 3/04; F05D 2220/40
(Continued)

(56) References Cited

U.S. PATENT DOCUMENTS 3,693,985 A * 9/1972 Dillner .................... F16J 15/36
                                                           277/381
5,096,396 A * 3/1992 Welch ................... F04C 13/005
                                                           277/365
(Continued)

FOREIGN PATENT DOCUMENTS

CN        204921454        12/2015
DE       102004041439        3/2006
(Continued)

OTHER PUBLICATIONS

International Search Report for Application No. PCT/EP2017/061950 dated Sep. 6, 2017 (English Translation, 2 pages).

*Primary Examiner* — Hoang M Nguyen
(74) *Attorney, Agent, or Firm* — Michael Best & Friedrich LLP

(57) ABSTRACT

The invention relates to a turbine (20) having an impeller (23) arranged in a housing (26). The turbine (20) has an inflow region (21) and an outflow region (22) and a working medium flows through said turbine during operation. The working medium flows into the inflow region (21), along a front side (23a) formed on the impeller (23) and subsequently out of the outflow region (22). There is a pressure drop at the front side (23a) between the inflow region (21) and the outflow region (22). A pressure distributer (9) is arranged on the rear side (23b) of the impeller (23), opposite the front side (23a). The pressure distributer (9) comprises a slide ring (31), which cooperates with the rear side (23b) of the impeller (23) and thereby forms a vapour-lubricated throttle. A first flow path (51) runs through the throttle, wherein the throttle hydraulically divides the rear side (23b) into a first region (231) and a second region (232). The first region (231) borders the inflow region (21), and the second region borders a pressure chamber (11). During operation, the inflow region (21) is applied with a higher pressure than (Continued)

the pressure chamber (11). The slide ring (31) is axially moveable. A sealing ring (33) arranged in a groove (41) cooperates with the slide ring (31). A second flow path (52) runs from the inflow region (21) to the pressure chamber (11) between the groove (41) and the slide ring (31). The second flow path (52) can be closed by the sealing ring (33). The sealing ring (33) can be moved in the groove (41) in a defined manner.

20 Claims, 5 Drawing Sheets

(58) Field of Classification Search
USPC ............ 60/614, 616, 618; 415/170.1, 171.1, 415/174.2, 174.3, 203; 417/406–409
See application file for complete search history.

(56) References Cited

U.S. PATENT DOCUMENTS

| | | | |
|---|---|---|---|
| 8,328,535 B2* | 12/2012 | Anschel | F04D 29/444 |
| | | | 417/407 |
| 9,188,133 B1 | 11/2015 | Richardson et al. | |
| 2013/0071243 A1* | 3/2013 | Kocher | F04D 29/668 |
| | | | 415/230 |
| 2016/0017888 A1* | 1/2016 | Nakaniwa | F04D 17/12 |
| | | | 415/203 |

FOREIGN PATENT DOCUMENTS

| | | |
|---|---|---|
| DE | 102010040823 | 3/2012 |
| DE | 102015012673 | 4/2016 |
| DE | 102014226861 | 6/2016 |
| DE | 102014226951 A1 | 6/2016 |
| EP | 1281836 | 2/2003 |
| EP | 2060804 A1 | 5/2009 |

* cited by examiner

TURBINE WITH PRESSURE DISTRIBUTER

BACKGROUND OF THE INVENTION

The invention relates to a turbine having an impeller, wherein a pressure distributer is arranged on the rear side of the impeller. The turbine can be used for example within a waste-heat recovery system for utilizing the waste heat of an internal combustion engine.

Turbines having a housing and an impeller arranged in the housing are known from the prior art, for example from patent EP 1 281 836 B1. The known turbine has an inflow region and an outflow region and a working medium flows through said turbine during operation. The working medium flows into the inflow region, along a front side formed on the impeller and subsequently out of the outflow region, wherein there is a pressure drop on the front side between the inflow region and the outflow region. Furthermore, the known turbine has at least two control valves which are controlled by a controller and control the pressure onto a rear side of the impeller. Consequently, the resulting aerodynamic flow acting on the impeller can be controlled in such a way that the resulting axial force, also termed axial thrust, is minimized. Accordingly, an axial bearing of the shaft is less loaded or the axial bearing can be dimensioned to be smaller.

Furthermore, a turbine having a pressure distributer is known from patent application DE 10 2014 226 951. The pressure distributer is arranged on the rear side of the impeller. The pressure distributer comprises a sliding ring which interacts with the rear side and thus forms a vapor-lubricated throttle. A first flow path runs through the throttle, wherein the throttle divides the rear side hydraulically into a first region and a second region. The first region delimits the inflow region, and the second region delimits a pressure chamber. The two regions are configured in such a way, that is to say separated by the throttle, that different pressures can be applied to them. During operation of the turbine, the inflow region is loaded with a higher pressure than the pressure chamber. The sliding ring is mounted in an axially movable or floating manner. A sealing ring arranged in a groove interacts with the sliding ring. A second flow path from the inflow region to the pressure chamber runs between the groove and the sliding ring. The second flow path can be closed by the sealing ring.

By virtue of the pressure distributer, the axial force acting on the impeller can be kept virtually constant. However, the axial movement of the sliding ring means that the sealing ring of the known turbine during operation is very highly loaded and thereby exposed to an increased risk of wear. Furthermore, the sealing function is therefore not robust over all operating pressures.

SUMMARY OF THE INVENTION

By contrast, the turbine according to the invention has the advantage that the loads acting on the sealing ring are minimized and at the same time the sealing function is ensured over all operating pressures of the turbine. The reliability and service life of the turbine is therefore increased. In addition, the sealing ring acts as a damping optimization element for the axial dynamics of the turbine.

For this purpose, the turbine according to the invention comprises a housing, wherein an impeller is arranged in the housing. The turbine has an inflow region and an outflow region and a working medium flows through said turbine during operation. The working medium flows into the inflow region, along a front side formed on the impeller and subsequently out of the outflow region. There is a pressure drop on the front side between the inflow region and the outflow region. A pressure distributer is arranged on the rear side of the impeller, opposite the front side. The pressure distributer comprises a sliding ring which interacts with the rear side of the impeller and thus forms a vapor-lubricated throttle. A first flow path runs through the throttle, wherein the throttle divides the rear side into a first region and a second region. The first region delimits the inflow region, and the second region delimits a pressure chamber. During operation, the inflow region is loaded with a higher pressure than the pressure chamber. The sliding ring is axially movable. A sealing ring arranged in a groove interacts with the sliding ring. A second flow path from the inflow region to the pressure chamber runs between the groove and the sliding ring. The second flow path can be closed by the sealing ring. The sealing ring is movable in the groove to a defined degree.

If, then, the impeller moves as a result of fluctuating operating pressures, the sliding ring can thus follow the impeller movement since the groove guides the sealing ring in a defined manner and thus the movement of the sliding ring is not blocked by the sealing ring. At comparatively low pressures in the inflow region, or low operating pressures, the axial movement of the sliding ring is intended to result in a rolling of the sealing ring. For this purpose, the frictional force, and hence also the pressure exerted on the sealing ring, must be large enough in order to avoid a slipping of the sealing ring in the groove. By contrast, at high operating pressures, the axial movement of the sliding ring is intended to result in a slipping or sliding of the sealing ring. For this purpose, the frictional force, and hence also the pressure exerted on the sealing ring, must then be comparatively small in order precisely to allow this slipping.

The defined guiding of the sealing ring in the groove means that a slipping at high pressures and a rolling at low pressures are ensured since the defined guiding results in a reduction of the contact force between the sliding ring and sealing ring with increasing inflow pressure. For this purpose, the groove is of preferably concave design. However, the sealing functionality is always ensured here, if required. The wear of the sealing ring is minimized since precisely the maximum contact pressure does not bear on the sealing ring over the entire service life.

In advantageous developments, the pressure chamber is hydraulically connected to the outflow region. As a result, at least part of the rear side of the impeller, namely the second region, is subjected to the pressure level of the outflow region, to the outflow pressure, or to a pressure level which is controlled by the outflow pressure. By virtue of the fact that the pressure loading on the front side of the impeller also depends on the outflow pressure, the pressure loadings on the front and rear side of the impeller are changed in a similar manner if the turbine is operated in different operating points. The resulting axial force acting on the impeller can thus be kept to a constantly low level. However, the level of the axial force is preferably set such that a change in direction of the axial force does not occur at the different operating points since the axial force thus has to be taken up only in one direction.

In advantageous configurations, the groove is of J-shaped design. The groove preferably has a tapering region in the round region of the J shape. Consequently, the sealing ring can be guided very well within the J shape. The distance of the center point of the cord thickness of the sealing ring from the sliding ring can thus be varied and the contact pressure from the sealing ring to the sliding ring thereby controlled.

In advantageous developments, the tapering region here is configured such that an inner sealing force $F_i$ between the sealing ring and the sliding ring, that is to say the contact force or the corresponding contact pressure, is reduced upon insertion of the sealing ring into the tapering region. The insertion of the sealing ring into the tapering region occurs as a result of a pressure increase in the inflow region. The impeller and sliding ring thus move in the same direction as the sealing ring. The sealing ring is also compressed on account of the higher inflow pressure. At the same time, the contact between the sealing ring and sliding ring is relieved upon insertion, however, with the result that the inner sealing force $F_i$ is reduced. Hence, the frictional force is also reduced, and a slipping of the sealing ring with respect to the sliding ring occurs.

The tapering region advantageously has a ramp region for inserting the sealing ring into the tapering region. As a result, the insertion or slipping-in is facilitated and at the same time the contact between the sealing ring and sliding ring is relieved. The ramp region is preferably rounded at its end in order not to damage the sealing ring during the insertion into the tapering region.

In advantageous developments, a linear ramp for guiding the sealing ring is formed on the ramp region. Here, the linear ramp is preferably inclined by 30° to 40° with respect to the sliding ring. This is an optimized configuration to reduce the contact pressure between the sealing ring and sliding ring with increasing inflow pressure. In advantageous developments, the sealing ring is lifted here from the sliding ring to such an extent that the sealing functionality is canceled and the second flow path is opened. The pressure of the inflow region can then be lowered; in this embodiment, the sealing ring then also fulfills the function of a pressure-relief valve.

In an advantageous embodiment, the groove is formed in the housing. This saves on components, and the turbine is thus designed to be more cost-effective.

In an alternative advantageous embodiment, the groove is formed in a clamping ring, wherein the clamping ring is fixedly connected to the housing, for example pressed into the latter. As a result, the dimensions and tolerances of the groove can be kept tighter. The functionality of the groove for guiding the sealing ring can thus be kept more robust.

In advantageous configurations, the sliding ring is clamped against the rear side of the impeller by a sliding ring spring. During operation of the turbine, on account of the centrifugal forces and the hydrodynamic design of the vapor gap in the pressure distributer, this results in a very narrow throttle gap between the rear side and sliding ring. The pressure distributer is thus very efficient, with the result that high pressure differences between the inflow region and the pressure chamber can also be achieved or maintained.

In advantageous embodiments, the turbine takes the form of a radial turbine. Consequently, by means of comparatively simple structural designs, the rear side of the impeller can be loaded with the pressures set by the pressure distributer, whereas the main flow direction of the working medium runs on the front side of the impeller.

In preferred embodiments, the turbine according to the invention designed as an expansion machine is arranged in a waste-heat recovery system in particular of an internal combustion engine. The waste-heat recovery system comprises, in the flow direction of the working medium, a feed fluid pump, an evaporator, the turbine and a condenser. The waste-heat recovery system is preferably not operated at a single operating point, but at very different operating points since the internal combustion engine is also operated at different operating points. Thus, different pressures also occur in the inflow region of the turbine, whereupon the impeller carries out axial movements. Accordingly, the sliding ring must also be able to accompany the axial movements in order to keep the functionality of the pressure distributer robust over all operating points. The configuration according to the invention of the sealing ring allows the sliding ring to dynamically follow the impeller movement in a manner which is as friction- and wear-free as possible without thereby losing its sealing effect. Consequently, it is very favorable for the overall efficiency and the service life of the waste-heat recovery system if the turbine can also run in a dynamically stable manner in the different operating conditions. Accordingly, the turbine according to the invention is particularly well-suited for this purpose.

DETAILED DESCRIPTION

Figure 1:
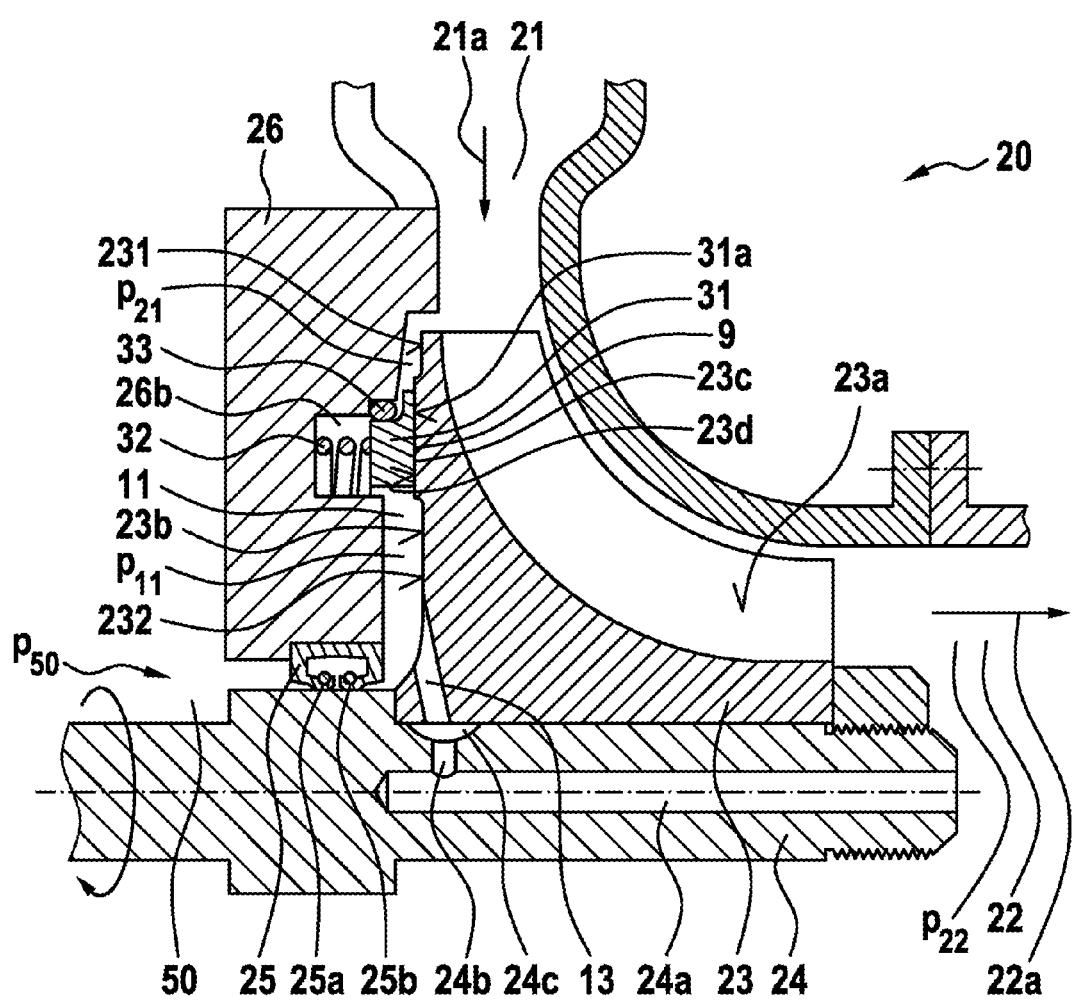
FIG. 1 schematically shows a turbine in longitudinal section, as is known from the prior art, with only the key regions being illustrated.

FIG. 1 schematically shows the installed construction of a turbine 20 in longitudinal section, as is known from the prior art, with only the key regions being illustrated. The turbine 20 takes the form of a radial turbine, with a radial inflow direction 21a of the working medium in an inflow region 21 and with an axial outflow direction 22a of the working medium in an outflow region 22. The turbine 20 of this exemplary embodiment can also be operated as a pump by reversing the flow directions 21a, 22a.

The turbine 20 comprises a housing 26 and, in the housing 26, an impeller 23 arranged on a shaft 24, the inflow region 21, the outflow region 22, a pressure distributer 9, a pressure chamber 11 and a shaft sealing ring 25. Here, the pressure distributer 9 is designed as a sliding ring 31 which interacts with a rear side 23b of the impeller 23.

The inflow region 21 has an inflow pressure $p_{21}$, and the outflow region 22 has an outflow pressure $p_{22}$. The working medium flows along a front side 23a of the impeller 23 from the inflow region 21 to the outflow region 22 and is thereby relieved, with the result that a pressure drop occurs between the inflow pressure $p_{21}$ and the outflow pressure $p_{22}$.

On the rear side 23b of the impeller 23, opposite the front side 23a, the pressure chamber 11, which is under the compensation pressure $p_{11}$, is formed between the housing 26 and the impeller 23. With respect to the impeller 23, the compensation pressure $p_{11}$ counteracts the axial components of the inflow pressure $p_{21}$ and of the outflow pressure $p_{22}$ on the front side 23a.

The shaft sealing ring 25 arranged on the housing 26 has two sealing lips 25a and 25b, with the result that the pressure chamber 11 can be well sealed with respect to a surrounding space 50 in both directions. For this purpose, the shaft sealing ring 25 interacts by way of both sealing lips 25a, 25b with the shaft 24 and thereby seals the pressure chamber 11 under compensation pressure $p_{11}$ with respect to the surrounding space 50 under surrounding pressure $p_{50}$.

Between the housing 26 and the impeller 23 or the rear side 23b, the pressure distributer 9 is designed as a throttle or as a vapor-lubricated throttle, with a gap between the sliding ring 31 and the rear side 23b. A shoulder 23c is arranged on the rear side 23b of the impeller 23. A sliding face 23d is arranged on the shoulder 23c on the end side in the direction of the housing 26. A receiving groove 26b is formed in the housing 26, opposite the sliding face 23d. The sliding ring 31 is arranged at least partially within the receiving groove 26b. An end face 31a formed on the sliding ring 31 interacts with the sliding face 23d preferably in the axial direction of the impeller 23 to form the throttle or the vapor gap. A sliding ring spring 32 arranged in the receiving groove 26b clamps the sliding ring 31 against the impeller 23. Arranged radially between the sliding ring 31 and housing 26 is a sealing ring 33 which seals the sliding ring 31 with respect to the housing 26.

The pressure distributer 9 hydraulically connects the pressure chamber 11 to the inflow region 21 via a first flow path which runs through the throttle. Here, the pressure distributer 9 is not arranged on the outermost circumference of the impeller 23 but between the outermost circumference and the diameter of the shaft 24, with the result that on the rear side 23b a first region 231 is subjected to the inflow pressure $p_{21}$ of the inflow region 21 and a second region 232 is subjected to the lower pressure of the pressure chamber 11, namely to the compensation pressure $p_{11}$. The sealing ring 33 blocks a second flow path from the inflow region 21 to the pressure chamber 11.

A blind bore 24a is formed in the shaft 24 in the axial direction. Furthermore, the following are formed in the shaft 24: a connecting bore 24b radially to the blind bore 24a and a groove 24c on the surface of the shaft 24. The impeller 23 has formed therein an outlet duct 13 which hydraulically connects the groove 24c to the pressure chamber 11.

Furthermore, the blind bore 24a opens into the outflow region 22. A hydraulic connection is thereby achieved in the flow direction of the working medium from the pressure chamber 11 via the outlet duct 13, the groove 24c, the connecting bore 24b and the blind bore 24a to the outflow region 22. In the exemplary embodiment of FIG. 1, the outlet duct 13, the connecting bore 24b and the blind bore 24a do not have a throttling function; hence, the pressure chamber 11 has the same pressure level as the outflow region 22: $p_{11}=p_{22}$.

The following pressure conditions are thus shown:

The pressure profile on the front side 23a of the impeller 23 shows a constant decrease in the pressure from the inflow pressure $p_{21}$ to the outflow pressure $p_{22}$ with decreasing radius r.

The pressure profile on the rear side 23b shows the constant inflow pressure $p_{21}$ at the first region 231, a constant decrease in the pressure above the pressure distributer 9 from the inflow pressure $p_{21}$ to the compensation pressure $p_{11}$, a constant compensation pressure $p_{11}$ at the second region 232 and a pressure jump at the shaft sealing ring 25 from the compensation pressure $p_{11}$ to the surrounding pressure $p_{50}$. Accordingly, the pressure distributer 9 is designed as a vapor-lubricated throttle between the inflow region 21 and the pressure chamber 11. Depending on the design of the turbine 20 and depending on the operating point in which it is operated, the compensation pressure $p_{11}$ can be lower than, but also equal to or greater than, the surrounding pressure $p_{50}$. Furthermore, in the present case, the compensation pressure $p_{11}$ is equal to the outflow pressure $p_{22}$.

The vapor-lubricated throttle can also be considered as a throttle with an extremely small flow cross section. The function of the vapor-lubricated pressure distributer is thus substantially that of ensuring a contactless, defined and as small as possible throttle point during operation in order to ensure a pressure-distributing function therewith.

At low rotational speeds of the impeller 23, the sliding ring 31 has its end face 31a come to bear with the sliding face 23d of the impeller 23 by means of the spring force of the sliding ring spring 32. The hydraulic connection from the inflow region 21 to the pressure chamber 11 is disconnected. At high rotational speeds of the impeller 23, a sliding film or a vapor cushion of the working medium is formed between the sliding face 23d and the end face 31a, with the result that the two faces lift off from one another and a throttle point is thereby formed, wherein, by virtue of the vapor cushion, only a very small leakage from the inflow region 21 into the pressure chamber 11 occurs.

The mode of operation of the known turbine 20 is as follows:

During operation of the turbine 20, there is a pressure drop on the front side 23a of the impeller 23. If the turbine 20 is operated as a radial turbine, the pressure from the radially outer inflow region 21 to the radially inner outflow region 22 drops from inflow pressure $p_{21}$ to outflow pressure $p_{22}$. If the turbine 20 is operated as a pump, the direction of flow of the working medium is reversed and, correspondingly, the two regions, namely inflow region 21 and outflow region 22, are also oppositely arranged; nevertheless, there is also a pressure drop on the front side 23a for these embodiments.

The pressure drop on the front side 23a generates an axial force onto the impeller 23, that is to say in the case of a radial turbine a force oriented counter to the outflow direction 22a. According to the invention, the pressure on the rear side 23b of the impeller 23 is now configured with the aid of the pressure distributer 9 such that this pressure approximately generates a counterforce which is equal to the axial force acting on the front side 23a, and therefore the resulting hydraulic pressure acting on the impeller 23 is approximately zero in the axial direction. Accordingly, it is possible for simple and thus cost-effective and space-saving axial bearings to be used for the impeller 23 or the shaft 24. Advantageously, the pressure on the rear side 23b is configured such that a resulting hydraulic force which is as low as possible bears in a fixed direction over all operating states, and therefore the corresponding axial bearing also only has to take up forces in one direction.

For this purpose, the pressure bearing on the rear side 23b is divided into the first region 231 with inflow pressure $p_{21}$ and the second region 232, which has compensation pressure $p_{11}$ or, in the embodiment of FIG. 1, outflow pressure $p_{22}$.

If the turbine 20 is brought into operation, a local gas/vapor pressure builds up in the pressure distributer 9 between the impeller 23 and sliding ring 31, the resulting force of which causes the sliding ring 31 to float. During operation of the turbine 20, the floatingly mounted sliding ring 31 therefore carries out axial movements, with the result that the sealing ring 33 is also correspondingly loaded. Here, according to the invention, the sealing ring 33 is arranged and guided such that its wear behavior is minimized and also the oscillation dynamics of the sliding ring 31 and impeller 23 remain stable. In this respect, FIG. 2 shows a corresponding detail of the turbine 20 in the region of the sealing ring 33 in section.

Figure 2:
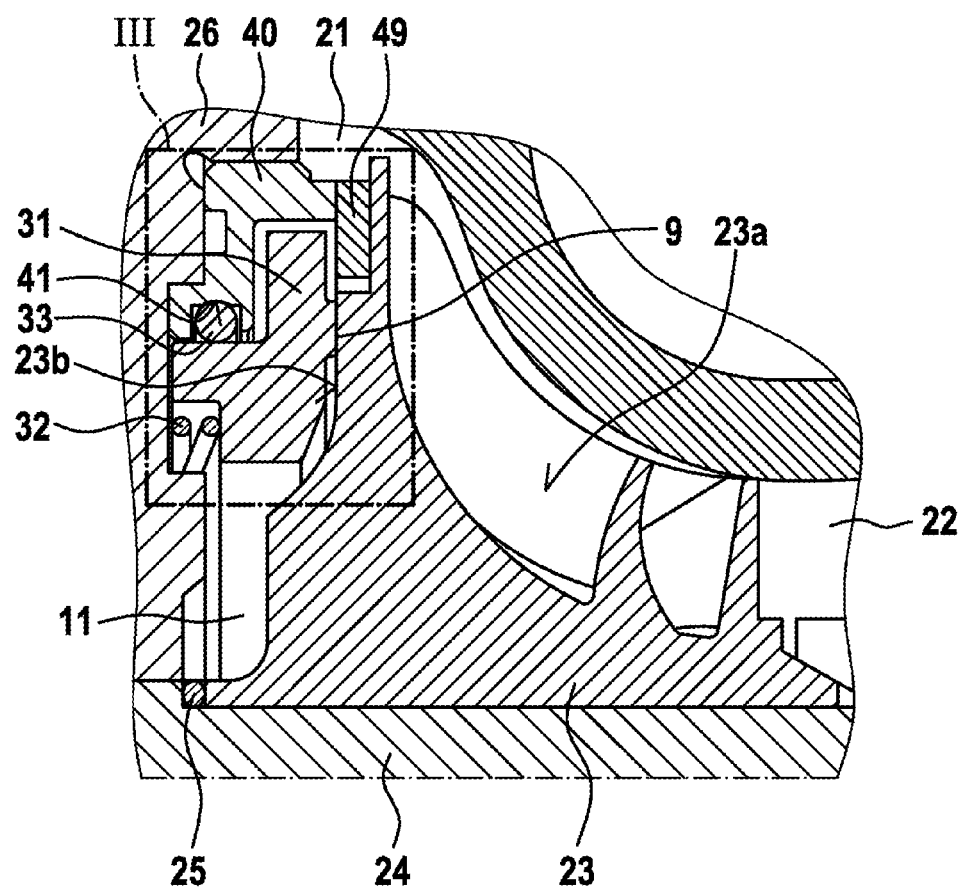
FIG. 2 shows a detail of the turbine in the region of a sealing ring in section.

In the embodiment of FIG. 2, the turbine 20 has a clamping ring 40 which is fixedly connected to the housing 26, for example is pressed into the latter. The sealing ring 33 is arranged in a groove 41 of the clamping ring 40 and therefore interacts with the clamping ring 40 and the sliding ring 31. The sliding ring 31 is prestressed with respect to the impeller 23 by the sliding ring spring 32 but not in a sealing manner, but rather such that, during operation of the turbine 20, the pressure distributer 9 takes the form of a hydrodynamic gap or a throttle between the sliding ring 31 and the rear side 23b of the impeller 23.

In advantageous embodiments, a stop ring 49 is arranged on the clamping ring 40 and limits a maximum axial displacement of the sliding ring 31, that is to say constitutes as it were an axial bearing of the sliding ring 31.

The sealing ring 33, which preferably consists of elastomer material, has, between the sliding ring 31 and the clamping ring 40, a sealing and damping function for the axial movement of the sliding ring 31. For this purpose, the pressure exerted by the sealing ring 33 must be sufficiently large in order, on the one hand, to allow the sealing function but, on the other hand, the pressure exerted must also not be too high in order also not to impede the required axial movement of the sliding ring 31.

Figure 3:
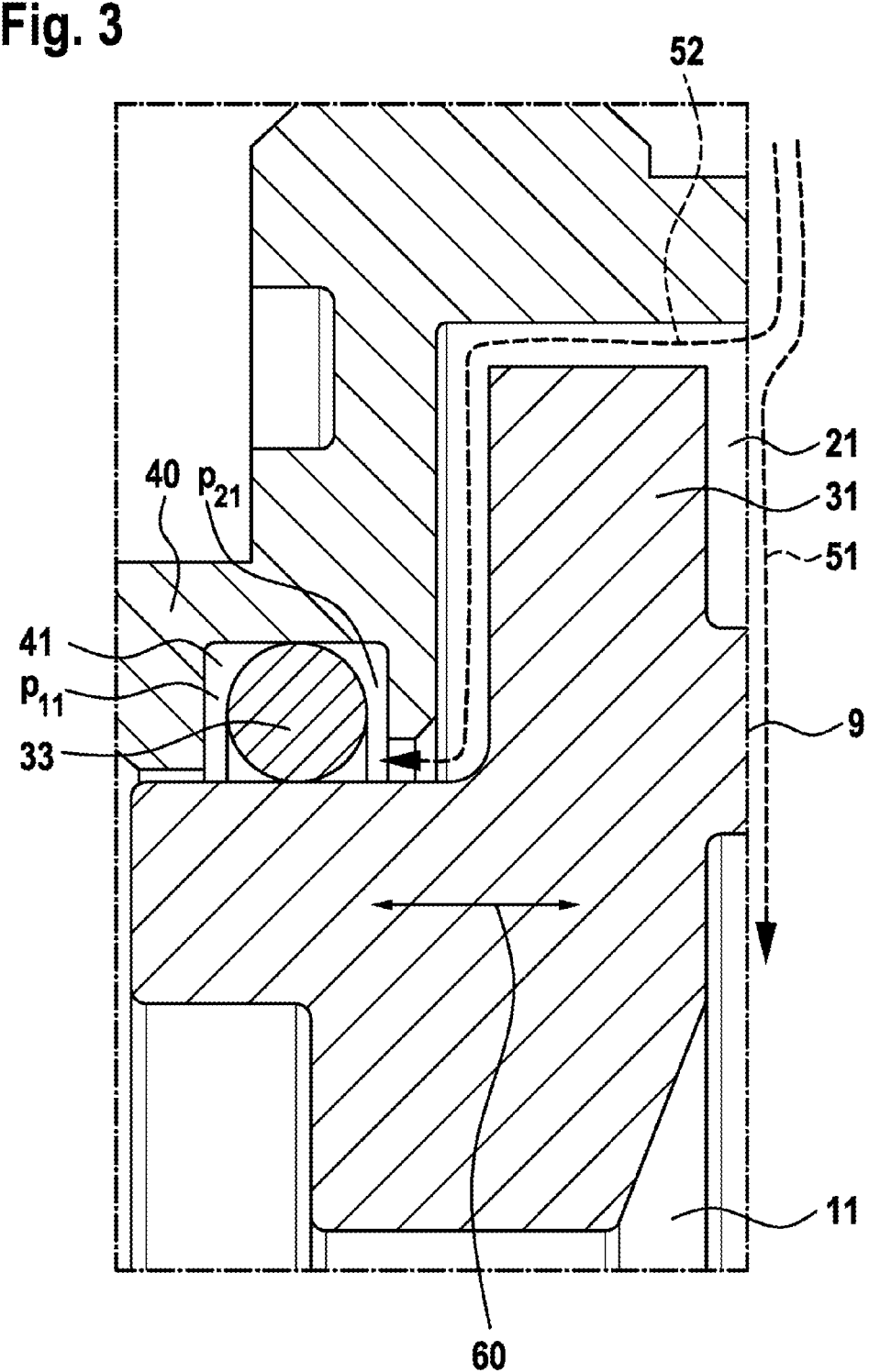
FIG. 3 shows the detail III of FIG. 2.

FIG. 3 shows the detail III of FIG. 2. In FIG. 3, the flow conditions in the region of the sliding ring 31 are depicted. The first flow path 51 runs from the inflow region 21 via the pressure distributer 9 or through the throttle into the pressure chamber 11, and the second flow path 52 runs from the inflow region 21 to the sealing ring 33 which seals the second flow path 52 with respect to the pressure chamber 11. If the second flow path 52 were not sealed, it would also run further into the pressure chamber 11.

The sealing ring 33 is thus subjected on one of its sides to the inflow pressure $p_{21}$ of the inflow region 21, and on its other side to the compensation pressure $p_{11}$ of the pressure chamber 11. During pressure changes, especially in the inflow region 21, there then results an axial movement of the sliding ring 31, as illustrated in principle by the arrow 60. If this axial movement of the sliding ring 31 is not possible by rolling of the sealing ring 33 since the sealing ring 33 is pressed on one side into the groove 41 by pressure build-up in the second flow path 52, there takes place a sliding movement between the sealing ring 33 and the sliding ring 31. Here, the force required for the sliding movement is dependent on the coefficient of friction between the two friction partners, namely sealing ring 33 and sliding ring 31, and the corresponding normal force or contact force, that is to say dependent on the adhesive force or frictional force between the friction partners. The greater the pressure with which the sealing ring 33 is pressed in the groove 41, the greater the normal force and thus also the adhesive force or frictional force.

Figure 4:
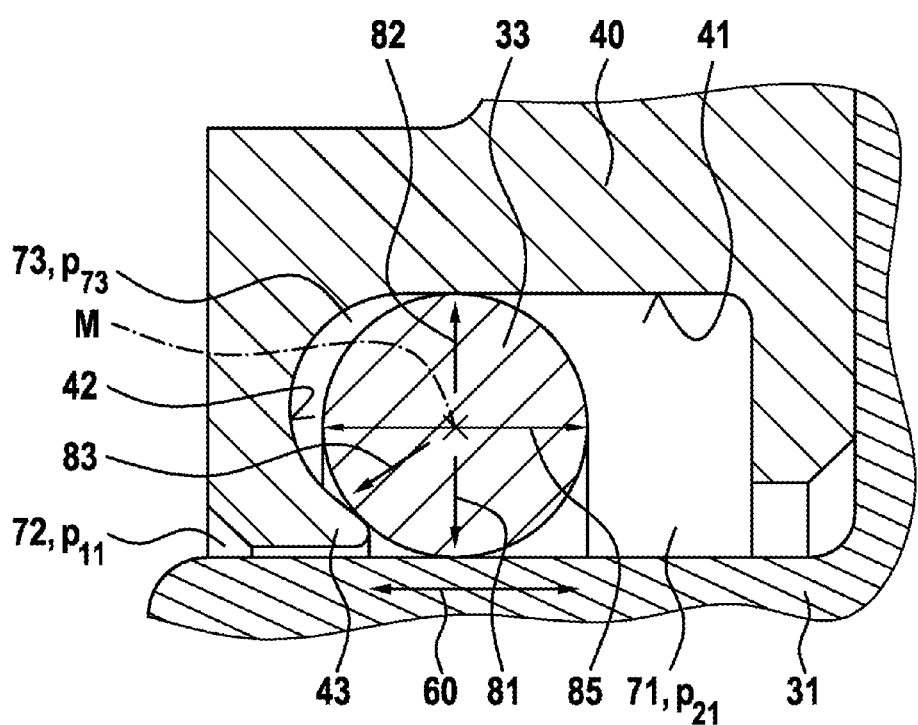
FIG. 4 shows a configuration according to the invention of the turbine in the region of the sealing ring in section.

During operation, a distinction is drawn between two types of movement of the sealing ring 33, wherein these two types of movement lead to an optimum sealing function of the sealing ring 33 combined with minimum wear, for which purpose a design of the groove 41 as shown for example in FIG. 4 is required:

If the axial movement of the sliding ring 31 is intended to result in a rolling of the sealing ring 33, the frictional force and thus also the pressure exerted on the sealing ring 33 must be large enough to avoid a slipping of the sealing ring 33 in the groove 41. This is the case if the inflow pressure $p_{21}$ is comparatively low.

If the axial movement of the sliding ring 31 is intended to result in a slipping or sliding of the sealing ring 33, the frictional force and thus also the pressure exerted on the sealing ring must then be comparatively small to allow a slipping. This is the case if the inflow pressure $p_{21}$ is comparatively high.

FIG. 4 shows the configuration according to the invention of the J-shaped, concave groove 41 of the clamping ring 40 in section, wherein the groove 41 could alternatively also be formed in the housing 26. The sealing ring 33 is subjected over its circumference to pressures from three chambers:

A first chamber 71 is formed between the groove 41, the sealing ring 33 and sliding ring 31 toward the inflow region 21 and accordingly subjected to the inflow pressure $p_{21}$.

A second chamber 72 is formed between the sealing ring 31, clamping ring 40 and sliding ring 31 toward the pressure chamber 11 and accordingly subjected to the compensation pressure $p_{11}$.

A third chamber 73 constitutes a type of dead volume and is formed between the clamping ring 40 and sealing ring 33. This third chamber 73 arises when the inflow pressure $p_{21}$ is so high that the sealing ring 33 is consequently pushed into a tapering region 42 of the groove 41. If the third chamber 73 is hydraulically separated from the pressure chamber 11, a banking-up pressure $p_{73}$ prevails therein, otherwise the compensation pressure $p_{11}$ of the pressure chamber 11 prevails therein.

FIG. 4 further shows the reaction forces of the sealing ring 33 with respect to its contact partners at a comparatively high inflow pressure $p_{21}$ if the sealing ring 33 is pressed at least partially into the tapering region 42:

An inner sealing force $F_i$ 81 acts between the sealing ring 33 and the sliding ring 31.

An outer sealing force $F_a$ 82 acts between the sealing ring 33 and the clamping ring 40.

A further sealing force $F_p$ 83 acts between the sealing ring 33 and the tapering region 42.

To seal the clamping ring 40 with respect to the sliding ring 31, or to terminally close the second flow path 52, the inner sealing force $F_i$ 81 and the outer sealing force $F_a$ 82 must be sufficiently large that the sealing ring 33 can fulfill the sealing function.

A ramp region 43 is formed in the concave tapering region 42 of the groove 41. The ramp region 43 is configured so as to be directed in the form of a nose toward the sliding ring 31, with the result that, upon insertion of the sealing ring 33 into the tapering region 42, the sealing ring 33 is lifted off from the sliding ring 31 via the ramp region 43 or relieved. Consequently, the inner sealing force $F_i$ 81 with respect to the sliding ring 31 is reduced and the outer sealing force $F_a$ 82 with respect to the clamping ring 40 is increased. Furthermore, with increasing insertion of the sealing ring 33 into the tapering region 42, the further sealing force $F_p$ 83 is also increased. With the reduction of the inner sealing force $F_i$ 81, the relative movement between the sealing ring 33 and sliding ring 31 passes from rolling into slipping.

An increase in the inflow pressure $p_{21}$ in the first chamber 71 results in the sealing ring 33 being rolled or pushed in the direction of the tapering region 42, but also in it being compressed, that is to say its diameter 85 in the movement direction 60 is reduced. Consequently, in turn, there would result a free expansion perpendicular to this direction, with the result that, in the clamped state, the inner sealing force $F_i$ 81 and the outer sealing force $F_a$ 82 would be increased.

However, the configuration according to the invention of the groove 41 means that, with the insertion of the sealing ring 33 into the tapering region 42, the inner sealing force $F_i$ 81 is reduced again because the center point M of the cross section of the sealing ring 33 moves away from the sliding ring 31 as a result. Thus, it is possible in all operating states of the turbine 20 for the sliding ring 31 to follow the movement of the impeller 23 without it being held back by the frictional force with respect to the sealing ring 33. By complete contrast: with increasing rolling-in in the direction of the tapering region 42, the inner sealing force $F_i$ 81 is reduced, with the result that the movement state of the sealing ring 33 can pass into slipping. The associated increase in the outer sealing force $F_a$ 82 has a very low, negligible influence on the efficiency and the wear behavior.

With the insertion of the sealing ring 33 into the tapering region 42, more exactly with the buildup of the further sealing force $F_p$ 83 or with the contact between sealing ring 33 and ramp region 43, the third chamber 73 is separated from the second chamber 72, and the banking-up pressure $p_{73}$ builds up and becomes ever greater with increasing insertion. If the inflow pressure $p_{21}$ subsequently decreases, the sealing ring 33 is pushed out of the tapering region 42 by virtue of the banking-up pressure $p_{73}$, and there occurs as it were an automatic return of the sealing ring 33.

By virtue of the configuration of the groove 41 as described in the embodiment of FIG. 4, the following advantages thus result for the turbine 20:

At a low inflow pressure $p_{21}$, the sealing ring 33 rolls in the groove 41 between the clamping ring 40 and sliding ring 31.

A sufficiently minimum pressure exertion for the sealing function between the sealing ring 33 and sliding ring 31 is always maintained if the sealing ring 33 does not also have the functionality of a pressure-relief valve.

On the other hand, the pressure exertion between the sealing ring 33 and sliding ring 31 never increases to such a degree that it impedes the movement of the sliding ring 33. Consequently, the pressure distributer 9 has a constant throttle function since the sliding ring 31 can follow the impeller movement.

The deformation of the sealing ring 33 is minimized, with the result that a virtually symmetrical stress state is established, which in turn is very advantageous for the sealing function and service life.

By virtue of the pressure cushion provided by the banking-up pressure $p_{73}$, the return movement of the sealing ring 33 out of the groove 41 occurs with pressure assistance and thus very efficiently and with low wear.

Figure 5:
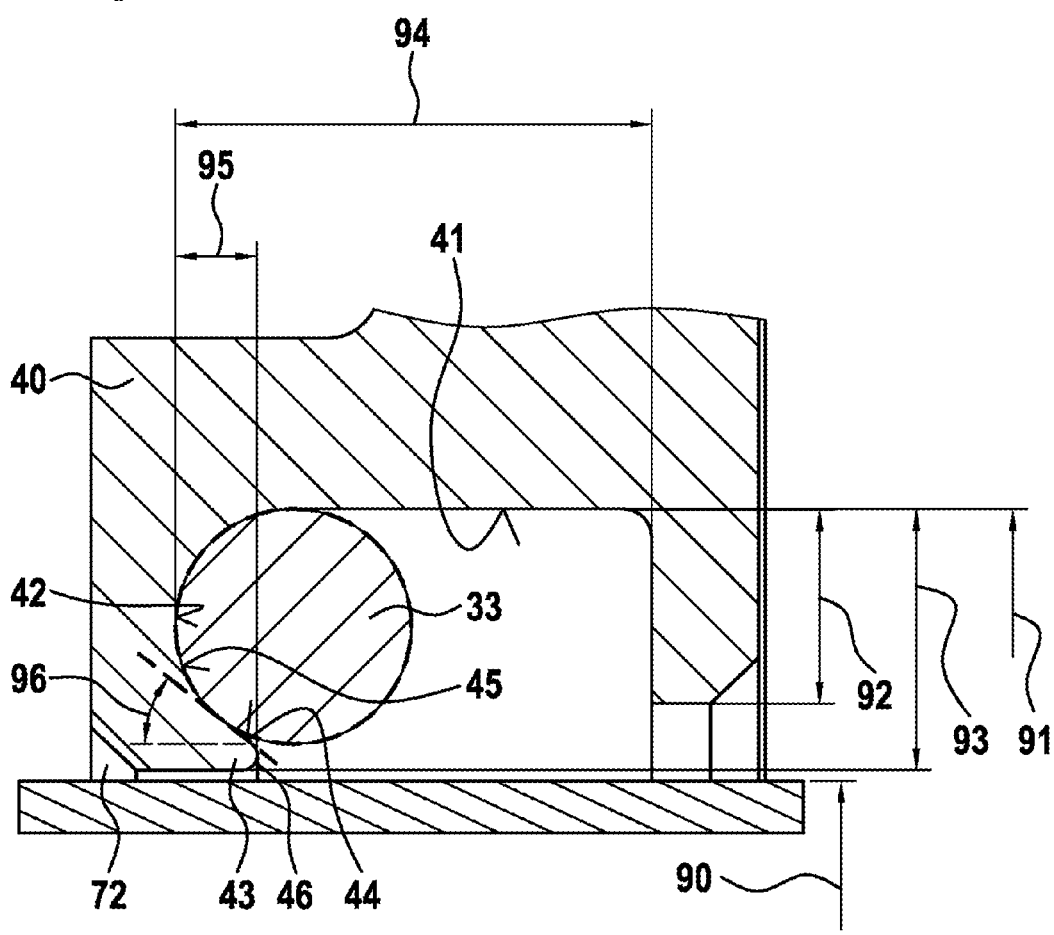
FIG. 5 shows a detailed configuration of a groove for receiving the sealing ring in section.

FIG. 5 shows a detailed configuration of the groove 41 in cross section in a preferred embodiment. In this embodiment, the sealing ring 33 is pushed completely into the tapering region 42, with the result that the volume of the third chamber 73 is reduced virtually to zero; however, there is preferably present a residual volume of the third chamber 73 with a comparatively high banking-up pressure $p_{73}$. In this position, the sealing ring 33 no longer seals the second chamber 72 with respect to the first chamber 71 since the sealing ring 33 no longer has contact with the clamping ring 31. The illustration of the sealing ring 33 in FIG. 5 is purely schematic, and the sealing ring 33 is illustrated in an excessively compressed state.

In the illustrated position of the sealing ring 33, it is possible with a very high inflow pressure $p_{21}$ in the first chamber 71, and thus also in the inflow region 21, for the inflow pressure $p_{21}$ to be reduced in that the second flow path 52 is freed. If then the inflow pressure $p_{21}$ in the first chamber 71 decreases as a result of the leakage through the second flow path 52, the sealing ring 33 comes out of the tapering region 42 again—preferably on account of the hydraulic force provided by the banking-up pressure $p_{73}$—and again provides sealing with respect to the sliding ring 31. This operation is thus reversible, with the result that the sealing ring 33 has the additional function of a pressure-relief valve.

By virtue of the favorable configuration of the groove 41, only a relatively small deformation of the sealing ring 33 is produced upon pressing of the sealing ring 33 into the tapering region 42. The sealing again of the second flow path 52, or the sliding of the sealing ring 33 out of the tapering region 42, thus occurs in a comparatively unimpeded manner, with the result that the movements of the sealing ring 33 can be repeated very robustly.

FIG. 5 further shows particularly advantageous geometries of the J-shaped groove 41 for a turbine 20 with an inflow pressure $p_{21}$ of up to 40 bar and a compensation pressure $p_{11}$ of approximately 1 bar. Here, the sliding ring 31 has an outside diameter $D_{31}$ 90 of approximately 42 mm, and the groove 41 has a diameter $D_{41}$ 91 of approximately 45.5 mm. This results in a ring diameter of the sealing ring 33—that is to say a diameter of its cross section or the cord thickness—of more than 1.75 mm since the sealing ring 33 has to be pressed with an oversize between the groove 41 and the sliding ring 31 in order to fulfill the sealing function.

The tapering region 42 extends over a height $h_{42}$ 93 of approximately 1.7 mm, with the result that, with the second flow path 52 opened, an annular gap with a gap height of approximately 0.05 mm is established. On the side opposite the tapering region 41, the groove 41 has a smaller height $h_{41}$ 92 of approximately 1.25 mm. The groove 41 has overall a width $b_{41}$ 94 of approximately 3 mm, with the tapering region 42 having a width $b_{42}$ 95 of approximately 0.7 mm.

The inner contour of the tapering region 42 is configured such that the insertion of the sealing ring 33 is optimized: in the ramp region 43, the inner contour has a linear ramp 44, that is to say a straight contour portion, with the result that the sealing ring 33 can be pushed along this surface in the direction of the third chamber 73 without thereby having to apply excessively high forces. Adjoining this, the inner contour has a circular region 45, that is to say a circular contour portion, against which the sealing ring 33 can hug in the extreme case, wherein the circular region 45 preferably has a smaller diameter than the sealing ring 33 itself, with the result that the third chamber 73 can be formed.

The ramp region 43 is ideally provided with a radius 46, for example 0.1 mm, in order not to damage the sealing ring 33 upon insertion of the sealing ring 33 into the tapering region 42. The ramp region 43 or the linear ramp 44 preferably rises with an angle 96 of 30° to 40°, which ensures an optimized reduction of the inner sealing force $F_i$ 81 at increasing inflow pressure $p_{21}$.

When the sealing ring 33 comes into contact with the tapering region 42, the sealing ring 33 rolls onto the oblique plane of the linear ramp 44. The linear ramp 44 serves as a ramp and allows a directed deformation of the sealing ring 33. The radius 46 of the ramp region 43 is, in a targeted manner, smaller than the sealing ring radius—or than half the cord thickness—and allows a displacement of the sealing ring 33 into the tapering region 42 with a pressure buildup on the rear side of the sealing ring 33, that is to say with the buildup of the banking-up pressure $p_{73}$ in the third chamber 73.

The turbine 20 according to the invention is preferably arranged in a waste-heat recovery system of an internal combustion engine. The waste-heat recovery system has a working medium-channeling circuit which comprises, in the flow direction of the working medium, a feed fluid pump, an evaporator, the turbine 20 and a condenser. If and as required, the working medium can be fed into the circuit from a collecting tank via a branch line and a valve arrangement. Here, it is alternatively also possible for the collecting tank to be incorporated in the circuit.

The evaporator is connected to an exhaust-gas line of the internal combustion engine, and thus utilizes the heat energy of the exhaust gas of the internal combustion engine.

Liquid working medium is delivered by the feed fluid pump, where appropriate from the collecting tank, into the evaporator and evaporated there by the heat energy of the exhaust gas of the internal combustion engine. The evaporated working medium is then expanded in the expansion machine or turbine 20 while outputting mechanical energy, for example to a generator or to a transmission. The working medium is then liquefied again in the condenser and returned to the collecting tank or fed to the feed fluid pump.

The invention claimed is:

1. A turbine (20) having an impeller (23) arranged in a housing (26), wherein the turbine (20) has an inflow region (21) and an outflow region (22) and a working medium flows through said turbine during operation, wherein the working medium flows into the inflow region (21), along a front side (23a) formed on the impeller (23) and subsequently out of the outflow region (22), wherein there is a pressure drop on the front side (23a) between the inflow region (21) and the outflow region (22), wherein a pressure distributer (9) is arranged on the rear side (23b) of the impeller (23) opposite the front side (23a), wherein the pressure distributer (9) comprises a sliding ring (31) which interacts with the rear side (23b) of the impeller (23) and thus forms a vapor-lubricated throttle, wherein a first flow path (51) runs through the throttle, wherein the throttle divides the rear side (23b) into a first region (231) and a second region (232), wherein the first region (231) delimits the inflow region (21) and wherein the second region delimits a pressure chamber (11), wherein the inflow region (21) is loaded with a higher pressure than the pressure chamber (11) during operation, wherein the sliding ring (31) is axially movable, wherein a sealing ring (33) arranged in a groove (41) interacts with the sliding ring (31), wherein a second flow path (52) runs from the inflow region (21) to the pressure chamber (11) between the groove (41) and the sliding ring (31), wherein the second flow path (52) can be closed by the sealing ring (33), characterized in that the sealing ring (33) is movable in the groove (41) to a defined degree.

2. The turbine (20) as claimed in claim 1, characterized in that the pressure chamber (11) is hydraulically connected to the outflow region (22).

3. The turbine (20) as claimed in claim 1, characterized in that the groove (41) is of J-shaped design, wherein the groove (41) has a tapering region (42).

4. The turbine (20) as claimed in claim 3, characterized in that an inner sealing force $F_i$ (81) between the sealing ring (33) and the sliding ring (31) is reduced upon insertion of the sealing ring (33) into the tapering region (42).

5. The turbine (20) as claimed in claim 3, characterized in that the tapering region (42) has a ramp region (43) for inserting the sealing ring (33) into the tapering region (42).

6. The turbine (20) as claimed in claim 5, characterized in that a linear ramp (44) for guiding the sealing ring (33) is formed on the ramp region (43).

7. The turbine (20) as claimed in claim 1, characterized in that the groove (41) is formed in the housing (26).

8. The turbine (20) as claimed in claim 1, characterized in that the groove (41) is formed in a clamping ring (40), wherein the clamping ring (40) is fixedly connected to the housing (26).

9. The turbine (20) as claimed in claim 1, characterized in that the sliding ring (31) is clamped against the rear side (23b) by a sliding ring spring (32).

10. The turbine (20) as claimed in claim 1, characterized in that the turbine (20) takes the form of a radial turbine.

11. A waste-heat recovery system for an internal combustion engine, wherein the waste-heat recovery system comprises a turbine (20) as claimed in claim 1, a condenser, a feed fluid pump and an evaporator.

12. The turbine (20) as claimed in claim 5, characterized in that a linear ramp (44) for guiding the sealing ring (33) is formed on the ramp region (43), wherein the linear ramp (44) is inclined by 30° to 40° with respect to the sliding ring (31).

13. The turbine (20) as claimed in claim 2, characterized in that the groove (41) is of J-shaped design, wherein the groove (41) has a tapering region (42).

14. The turbine (20) as claimed in claim 13, characterized in that an inner sealing force $F_i$ (81) between the sealing ring (33) and the sliding ring (31) is reduced upon insertion of the sealing ring (33) into the tapering region (42).

15. The turbine (20) as claimed in claim 14, characterized in that the tapering region (42) has a ramp region (43) for inserting the sealing ring (33) into the tapering region (42).

16. The turbine (20) as claimed in claim 15, characterized in that a linear ramp (44) for guiding the sealing ring (33) is formed on the ramp region (43).

17. The turbine (20) as claimed in claim 16, characterized in that the groove (41) is formed in the housing (26).

18. The turbine (20) as claimed in claim 16, characterized in that the groove (41) is formed in a clamping ring (40), wherein the clamping ring (40) is fixedly connected to the housing (26).

19. The turbine (20) as claimed in claim 16, characterized in that the sliding ring (31) is clamped against the rear side (23b) by a sliding ring spring (32).

20. The turbine (20) as claimed in claim 19, characterized in that the turbine (20) takes the form of a radial turbine.

* * * * *